3,558,594
ERYTHROMYCIN ALIPHATIC SULFATE
Peter Hadley Jones and Ronald Gay Wiegand, Lake Forest, and Alexander Hing Chinn Chun, Waukegan, Ill., assignors to Abbott Laboratories, North Chicago, Ill., a corporation of Illinois
No Drawing. Filed Sept. 4, 1968, Ser. No. 757,510
Int. Cl. C07c 47/18
U.S. Cl. 260—210
4 Claims

ABSTRACT OF THE DISCLOSURE

Among new aliphatic sulfate salts of erythromycin, the n-octadecyl sulfate salt especially exhibits not only sustained uniform blood serum levels in humans that are superior to other known salt forms, but also is so nearly tasteless that when administered as an aqueous suspension or as a chewable tablet, it lacks the objectionable pronounced and prolonged bitter taste experienced with erythromycin base and other acid addition salts. Hence, chewable tablets, uncoated tablets and aqueous suspensions are readily acceptable as oral dosage forms.

---

This invention relates to novel acid addition salts of erythromycin. In particular, this invention pertains to erythromycin aliphatic sulfate salts, especially erythromycin n-octadecyl sulfate.

Erythromycin is a well-known antibiotic having a broad spectrum of activity against the majority of commonly encountered bacterial infections. The accepted structural formula for erythromycin is fully set forth in J.A.C.S. 79, 6062 (1957), and the antibiotic is described in detail in Bunch et al., U.S. 2,653,899. For the present purpose, an abbreviated structural formula will suffice. Thus, erythromycin will herein be represented as follows

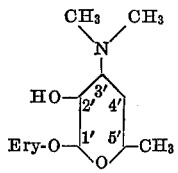

wherein Ery represents the erythronolide and cladinose moieties of Erythromycin A and Erythromycin B. The nitrogen atom of the desosamine moiety shown above is sufficiently basic to form acid addition salts with more acid substances. Certain salts have been found to have unique and desirable qualities, for example, the lactobionate U.S. 2,761,859 and thiocyanate U.S. 2,791,531.

Erythromycin base and all previously known acid addition salts, however, have an objectionably strong persistent bitter taste. This has been in the past overcome by means of providing coating for tablets of erythromycin to mask the taste, although it would be preferable to avoid such means. The newly discovered erythromycin aliphatic sulfates of this invention have the advantage that they are so tasteless they can be administered as uncoated tablets.

But what is more important, is that generally children will not tolerate tablets, even if coated. Younger children encounter difficulty in controlling the gag reflex, making it difficult or impossible to swallow unchewed objects. Older children are often reluctant to swallow a whole tablet regardless of how elegantly coated that tablet may be. Therefore, when administering oral pediatric dosages of any drug, the accepted practice is to dissolve or suspend the drug in another agent such as water, orange juice, and the like, or to put the drug in a chewable tablet.

Unfortunately, the strong and persistent bitter taste of erythromycin base and all previously known salts such as the stearic acid salt completely ruled out a pediatric dosage form comprising suspensions or chewable tablets. These dosage forms of erythromycin base and salts heretofore were not at all accepted by children.

Intramuscular administration, while solving the problem of bitter taste, clearly is not a satisfactory solution unless intramuscular administration is otherwise indicated. In addition, certain animals and fowl have been found to benefit from including erythromycin in their ration. Yet many, particularly swine, reject feed containing therapeutic levels of erythromycin base or its heretofore known acid addition salts because of the bitter taste.

Heretofore, insofar as pediatric dosages were concerned, the problem of tablet rejection and taste was solved by administering a 2'-ester of erythromycin such as the monoacetyl, the monopropionyl or the ethyl succinate either as granules or as a chewable tablet. These esters give high blood serum levels and heretofore were thought completely adequate to maintain therapeutic activity in the patient.

Of greatest importance, however, is the revelation by recent studies, later set forth, showing that the therapeutic value of 2'-erythromycin ester is derived mainly from hydrolyzed erythromycin and that unhydrolyzed erythromycin esters have very little therapeutic activity, although contributing heavily to any analytical measurement of total erythromycin serum level. Thus, esters such as the 2'-propionyl erythromycin lauryl sulfate, while indicating high blood serum levels, do not hydrolyze at a rate sufficient to give a significant serum level of hydrolyzed erythromycin until well into the course of treatment.

Furthermore, dosage of the 2'-propionyl erythromycin lauryl sulfate has been known to produce reversible cholestatic hepatitis in some individuals.

With this in mind, it can be seen that it is especially important that these newly discovered aliphatic sulfate salts, not being esters, will attain a blood serum level wherein all the erythromycin present in the blood serum is therapeutically active, and being tasteless can replace the esters as pediatric dosage forms.

A further important advantage, as will be seen, is that the aliphatic sulfate salts of this invention give a sustained blood level. Thus is avoided a high initial blood serum level that rapidly diminishes to a subtherapeutic level.

These new aliphatic sulfate salts of erythromycin can be depicted as follows

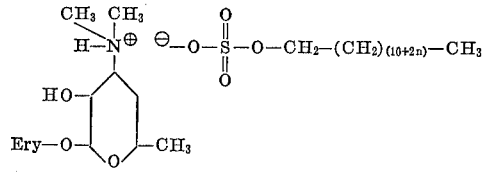

wherein $n$ is an integer from 0 to 4 inclusive. They include the n- or straight chain aliphatic salts: erythromycin dodecyl sulfate; erythromycin tetradecyl sulfate; erythromycin hexadecyl sulfate; erythromycin octadecyl sulfate; and erythromycin eicosyl sulfate. These new compositions are white solids, but like some other erythromycin salts, lack well defined melting points. The erythromycin activity is directly proportional to the ratio of the molecular weight of erythromycin to the molecular weight of the erythromycin aliphatic sulfate salt. For example, the erythromycin n-octadecyl sulfate shows an activity on the order of 675 units per mg. when in substantially pure form.

The aliphatic sulfate salt is prepared in the following manner. Erythromycin base, either A or B, is dissolved in a suitable solvent, such for example as aqueous acetone.

To this solution is added a molar equivalent of an alkali metal alphatic sulfate salt, together with an excess of an acid, acetic acid being preferable. Other suitable acids are sodium dihydrogen phosphate, hydrochloric and sodium hydrogen sulfate. The source of the hydrogen ion is not critical but a pH of about 6 is preferred, a range of 5.5–6.5 being desirable. The above acids will realize this pH range without elaborate pH control. The mixture is warmed to aid dissolution, although temperatures above 60° C. should be avoided to minimize decomposition of the erythromycin. Water is added and the resulting precipitate of erythromycin aliphatic sulfate collected.

The erythromycin aliphatic sulfates have the same spectrum of activity as erythromycin base, and can be used in an equivalent manner and dosage after adjustment is made to obtain equivalent activity per dose.

EXAMPLE I

Erythromycin A (22.5 g; 0.030 mole) was dissolved in 250 ml. acetone. Sodium n-octadecyl sulfate (11.2 g.; 0.030 mole) was suspended 250 ml. distilled water to which was then added 3.6 ml. (0.06 mole) of glacial acetic acid. The erythromycin and sodium n-octadecyl sulfate solutions were combined and heated to 55° C. with stirring to dissolve the solids. The resulting solution, after decolorizing with activated charcoal was cooled and yielded 28.5 g. (87%) of white needles of the erythromycin n-octadecyl sulfate salt. After collection, the salt was recrystallized from acetone-water mixtures to yield 23.0 g. (71%) of erythromycin stearyl sulfate having a melting point of approximately 150° C.

EXAMPLE II

In the same manner as Example I equimolar portions (0.030 mole) of Erythromycin A and sodium n-dodecyl sulfate were reacted and the product recrystallized to yield 25 g. (75%) of erythromycin n-dodecyl sulfate melting at 128–132° C.

EXAMPLE III

Tablets for oral administration are prepared by intimately admixing finely divided particles of the constituents tabulated below. Each constituent is present in a ratio such that after tabletting, each tablet contains approximately the indicated quantity of each constituent. These constituents are then tabletted on any suitable tabletting machine, such as a Stokes Press for example, fitted with suitable dies.

| | |
|---|---|
| Erythromycin n-octadecyl sulfate: | Q.s. to give activity equivalent to 250 mg. erythromycin base, mg. |
| Crystalline cellulose (Avicel®) 30,000–50,000 m.wt. particle size, 10–50µ | 114 |
| Anhydrous particulate colloidal silica (Cab-O-Sil®) | 10 |
| Polyvinylpyrrolidine | 13 |
| Pharmaceutical grade ion exchange resin (Amberlite®) | 5 |

EXAMPLE IV

Erythromycin n-octadecyl sulfate reconstitutable powder

To produce a powder that can be suspended in some suitable agent, the following procedure can be used. A granulation of the first four of the following constituents is made and then admixed with the remaining ingredients.

| | Parts by weight |
|---|---|
| Sodium citrate | 57.0 |
| Sodium saccharin | 1.0 |
| Sodium cyclamate | 7.5 |
| Sodium carboxymethylcellulose | 34.5 |
| F.D. & C. dye | Q.s. |
| Flavoring agent | Q.s. |
| Granular sucrose | 750.0 |
| Erythromycin n-octadecyl sulfate equivalent in activity to 100.0 parts erythromycin base. | |

EXAMPLE V

A chewable tablet comprising erythromycin n-octadecyl sulfate is prepared by intimately admixing finely divided particles of the constituents tabulated below. Each constituent is present in a ratio such that after tabletting, each able contains approximately the indicated quantity of each constituent. The mixture is then tabletted on a machine such as described in Example II.

| | Weight/tablet (mg.) |
|---|---|
| Erythromycin n-octadecyl sulfate equivalent to 200.0 erythromycin base. | |
| Mannitol | 461.0 |
| Sodium saccharin | 5.0 |
| Sodium cyclamate | 71.4 |
| Sodium citrate | 234.0 |
| Polyvinylpyrrolidine | 21.4 |
| Magnesium stearate | 29.2 |
| Flavor | Q.s. |

To illustrate the taste acceptability of erythromycin n-octadecyl sulfate, it was compared in the uncoated state with erythromycin thiocyanate that had been coated with shellac in an attempt to mask the bitter taste of the latter salt. The respective erythromycin salts were mixed with feed at a level of 220 g./metric ton.

When these rations were fed to pigs, the ration containing the erythromycin n-octadecyl sulfate was completely accepted, while that containing the shellac-coated erythromycin thiocyanate was rejected completely.

It has been found that feed containing as much as 551 g./metric ton of the erythromycin n-octadecyl sulfate is acceptable to pigs.

To further demonstrate complete acceptability, two pigs after 22 days on the erythromycin n-octadecyl sulfate at 224 g./metric ton consumed on the average 5.0 and 3.4 kg. of feed per day, respectively. Two pigs on the same ration, but containing no erythromycin medication consumed 3.5 and 4.2 kg. of feed per day, respectively.

From the above and also from the following human taste panel study shown in Table I, it can be seen that the inclusion of the erythromycin salt form of this invention is so tasteless that it does not diminish either food intake in pigs, or palatability in humans.

When the salts of this invention are tasted and rated according to bitterness on a scale of increasing bitter sensation from threshold, ½, 1, 1½, 2, 2½, to 3, they compare favorably with the 2' esters. To illustrate, the following erythromycin compositions were tasted by the taste panel and the following results obtained.

TABLE I

Taste evaluation in humans

| Composition | Taste evaluation range |
|---|---|
| Erythromycin base | 3. |
| Erythromycin ethyl succinate | Threshold–½. |
| Erythromycin stearate | 2½–3. |
| Erythromycin stearyl sulfate | Threshold–½. |

It appears that the water solubility of an erythromycin salt is dependent primarily on the size of the alkyl group of the acid. The bitterness level, however, is related not only to the water solubility of the salt and hence to the size of the alkyl group, but also to the stability of the salt and hence to the acid strength. It has now been discovered that the aliphatic sulfate salts have a relation between alkyl group size and acid strength that renders them tasteless, and the most taste-free salt of erythromycin is made from the strongest acid with the largest alkyl group, namely the stearyl sulfuric acid salt.

Turning attention now from taste acceptability, the superior blood serum level constancy of the erythromycin n-octadecyl sulfate can be appreciated by an examination of Table II. In that table, the blood serum half life ($t_{1/2}$) from the 2 to 6 hour period is recorded.

TABLE II

Apparent Serum Half Life Calculated From Average Serum Erythromycin Concentrations In Man Following A Single Oral Dose of 250 mg.

ERYTHROMYCIN ACTIVITY

| Erythromycin salt | No. of subjects | Apparent serum $t_{1/2}$ (hrs.) |
|---|---|---|
| Distearyl phosphate | 5 | 1.3 |
| Stearyl sulfamic acid | 5 | 1.1 |
| Stearate | 7 | 1.2 |
| n-Octadecyl sulfate | 8 | 3.7 |

This clearly shows the prolonged serum half-life of the acid addition salt of this invention. This is a valuable quality because it makes possible less frequent dosage, which is quite an advantage to the patient and also to those in charge of administering the drug.

As was mentioned previously, the 2' esters are not effective for delivering a full therapeutic active dose. This can be demonstrated in the following in vitro studies.

The hydrolysis half-life of various erythromycin esters in brain heart infusion (BHI) broth at pH 6.5 is compared below to the inhibition of growth of an actively growing culture of Staph. aureus in BHI broth at pH 6.5 by erythromycin base and these esters, each at a concentration of 1.0 μg./ml.

|  | Hydrolysis $t_{1/2}$ (min.) | In vitro percent inhibition of bacterial growth |
|---|---|---|
| Erythromycin |  | 62 |
| 2'-ethyl succinyl erythromycin | 46 | 36 |
| 2'-propionyl erythromycin | 90 | 10 |
| 2'-ethylcarbonyl erythromycin | 278 | 2 |
| 2'-benzoyl erythromycin | 830 | 1 |

The inhibition is greatest for the ester which hydrolyzes to erythromycin most rapidly, and esters of longer half-lives show progressively decreasing inhibition.

The ester of longest half-life shows only about 1% inhibition. By extrapolation, an ester with an infinite half-life, i.e., which fails to hydrolyze at all, would have an inhibitory effect approximately zero. It therefore seems proper to say that 2' esters of erythromycin and the salts of these esters are inactive until hydrolyzed.

This inference is substantiated by other experiments. These include tests of bactericidal activity of erythromycin and its 2' esters against Staph. aureus and a measure of inhibition by erythromycin and its 2' esters of polypeptide synthesis. This latter result was arrived at when ribosomes isolated from E. coli were incubated with $^{14}C$-phenylalanine and Poly-U, the radioactivity of the synthesized polypeptide being counted as a measure of protein synthesis.

To further contrast the 2'-propionyl erythromycin lauryl sulfate from the salts of this invention, the following test results are included. They show that in vivo, the amount of the therapeutically active hydrolyzed base is small compared to the unhydrolyzed ester.

TABLE III

[Average levels of 2'-propionyl erythromycin lauryl sulfate chewable tablet (250 mg. activity) mcg./ml. whole blood]

| | Total blood concentration | Percent of total which is base | Serum concentration of therapeutically active erythromycin base |
|---|---|---|---|
| Hours: | | | |
| 1 | .29 | 2 | .008 |
| 2 | .94 | 1 | .015 |
| 4 | .56 | 12 | .06 |
| 6 | .33 | 4 | .02 |

In order to even more clearly set forth a comparison between an ester form which is tasteless and hydrolyzes fairly rapidly ($t_{1/2}$=46 min.) and the erythromycin n-octadecyl sulfate of this invention which is also tasteless, Table IV and Table V illustrate a comparison between the salt and the ester.

TABLE IV

[Erythromycin blood assay (human) mcg./ml. blood serum (disc assay)]

| | Erythromycin n-octadecyl sulfate granules 400 mg., erythromycin activity | | | |
|---|---|---|---|---|
| | 1 hr. | 2 hrs. | 4 hrs. | 6 hrs. |
| Subject: | | | | |
| 1 | .443 | .256 | .600 | .157 |
| 2 | .272 | .790 | .477 | .357 |
| 3 | .072 | .346 | .415 | .157 |
| 4 | .563 | .168 | .300 | .152 |
| 5 | | .275 | .278 | .188 |
| 6 | .893 | .380 | .262 | .105 |
| 7 | .165 | .235 | .227 | .162 |
| 8 | | .428 | .520 | .193 |
| 9 | .068 | .29 | .267 | .095 |
| Average | .354 | .288 | .304 | .142 |

TABLE V

[Erythromycin ethyl succinate chewable tablet 400 mg. erythromycin activity (mcg./ml.)]

| | 1 hour | | 2 hours | | 4 hours | | 6 hours | |
|---|---|---|---|---|---|---|---|---|
| | Total unhydrolyzed ester and base | Base | Total unhydrolyzed ester and base | Base | Total unhydrolyzed ester and base | Base | Total unhydrolyzed ester and base | Base |
| Subject: | | | | | | | | |
| 10 | 0.40 | 0.09 | 0.33 | 0.03 | 0.17 | 0.02 | 0.01 | |
| 11 | 0.41 | 0.05 | 0.28 | 0.06 | 0.09 | 0.03 | 0.02 | |
| 12 | 0.33 | 0.03 | 0.15 | 0.04 | 0 07 | 0.03 | 0.02 | |
| 13 | 0.20 | 0.03 | 0.09 | 0.09 | 0.04 | ¹0.02 | 0.02 | |
| 14 | 0.08 | 0.08 | 0.05 | 0.05 | 0.09 | 0.04 | 0.03 | |
| 15 | 0.13 | | 0.12 | 0.08 | 0.06 | ¹0.02 | 0.02 | |
| 16 | 0.50 | 0.08 | 0.29 | 0.08 | 0.08 | 0.04 | 0.07 | |
| 17 | 0.66 | 0.05 | 0.33 | 0 09 | 0.14 | 0.08 | 0.04 | |
| 18 | 0.52 | 0.06 | 0.33 | 0.14 | 0.12 | ¹0.50 | 0.03 | |
| Average | 0.36 | 0.06 | 0.22 | 0.06 | 0.10 | 0.04 | 0.03 | <0.03 |

¹ Estimated.

Thus, the salt of this invention is present in human blood serum in a therapeutically active form, at a therapeutically significant level for an extended period. In contrast, even a relatively rapidly hydrolyzing ester while present in impressive amounts as the unhydrolyzed ester, is present in relatively small amounts (e.g., 0.06 mcg./ml. vs. 0.354 mcg./ml. at 1 hour) as the hydrolyzed base.

Now that the foregoing experimental results are known and realized, one can appreciate that the erythromycin alpihatic sulfate salts of this invention are novel salts having unique and unexpected properties. In the foregoing specification, these properties have been exemplified by erythromycin n-octadecyl sulfate, because this salt, among the erythromycin aliphatic sulfates disclosed, possesses these properties to a remarkable degree.

The compounds of this invention are all prepared and used in a manner identical to that disclosed for erythromycin n-octadecyl sulfate.

We claim:
1. An erythromycin aliphatic sulfate salt having the formula

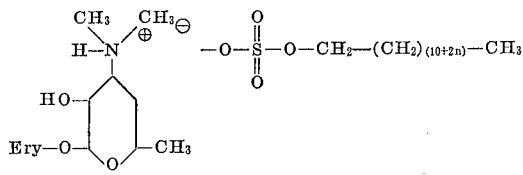

wherein Ery represents the erythronolide and cladinose moieties of erythromycin A and B and $n$ is an integer from 0 to 4 inclusive.

2. A salt according to claim 1 in which $n$ is 3, namely erythromycin n-octdecyl sulfate.

3. A salt according to claim 1 in which $n$ is 2, namely, erythromycin n-hexadecyl sulfate.

4. A salt according to claim 1 in which $n$ is 1, namely, erythromycin n-tetradecyl sulfate.

References Cited

UNITED STATES PATENTS 3,000,874   9/1961   Bray et al. _____ 260—210E

OTHER REFERENCES

Chemical Abstract, vol. 66, 1967, p. 1260s, col. 1.

LEWIS GOTTS, Primary Examiner

J. R. BROWN, Assistant Examiner

U.S. Cl. X.R.

424—180